May 3, 1949.　　　　S. W. LANGDON　　　　2,468,935
PHOTOGRAPHIC APPARATUS FOR REPRODUCTION
BY DIRECT OR REFLECTED LIGHT BEAMS
Filed Jan. 25, 1945　　　　　　　　　　　　　4 Sheets-Sheet 1
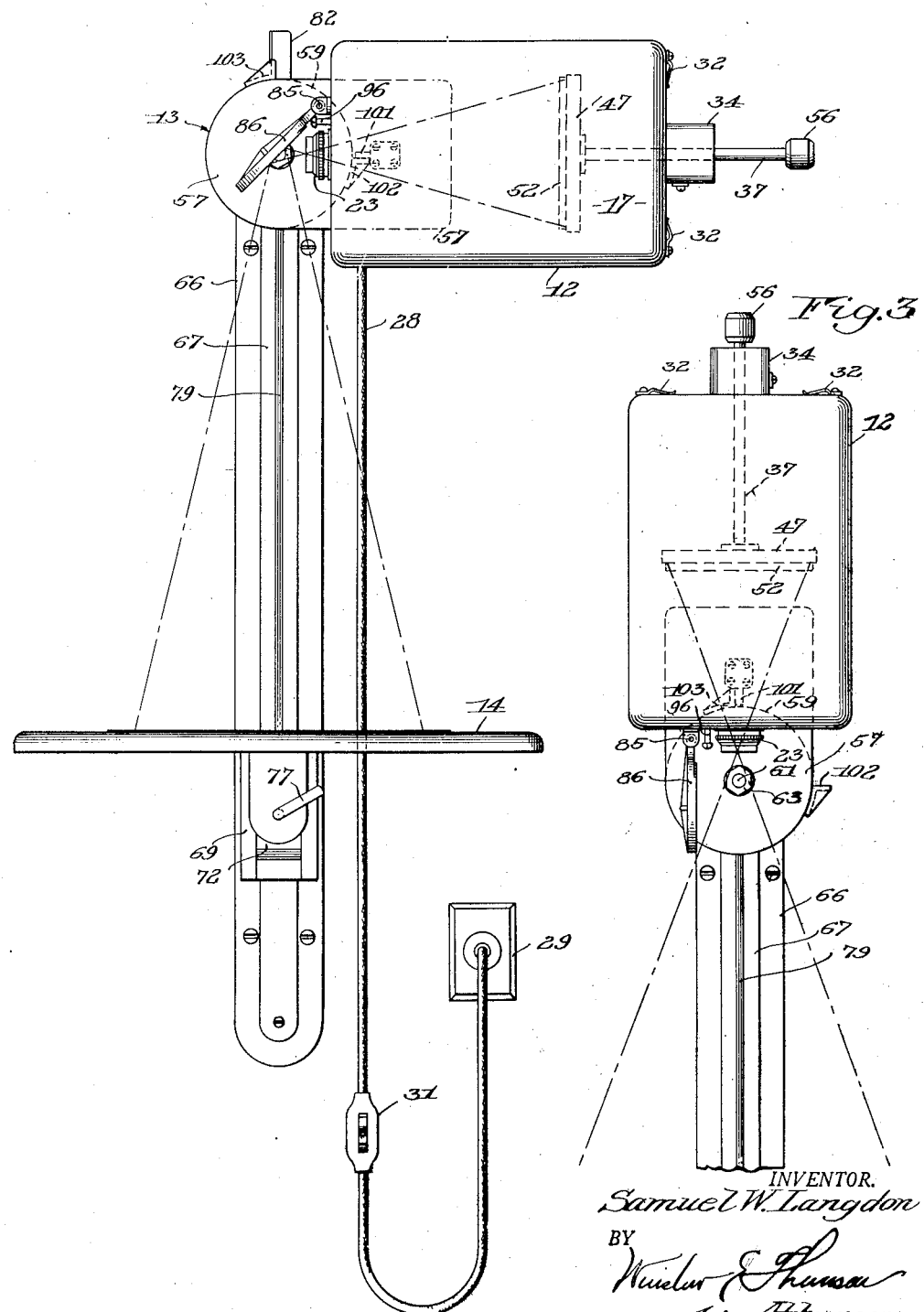

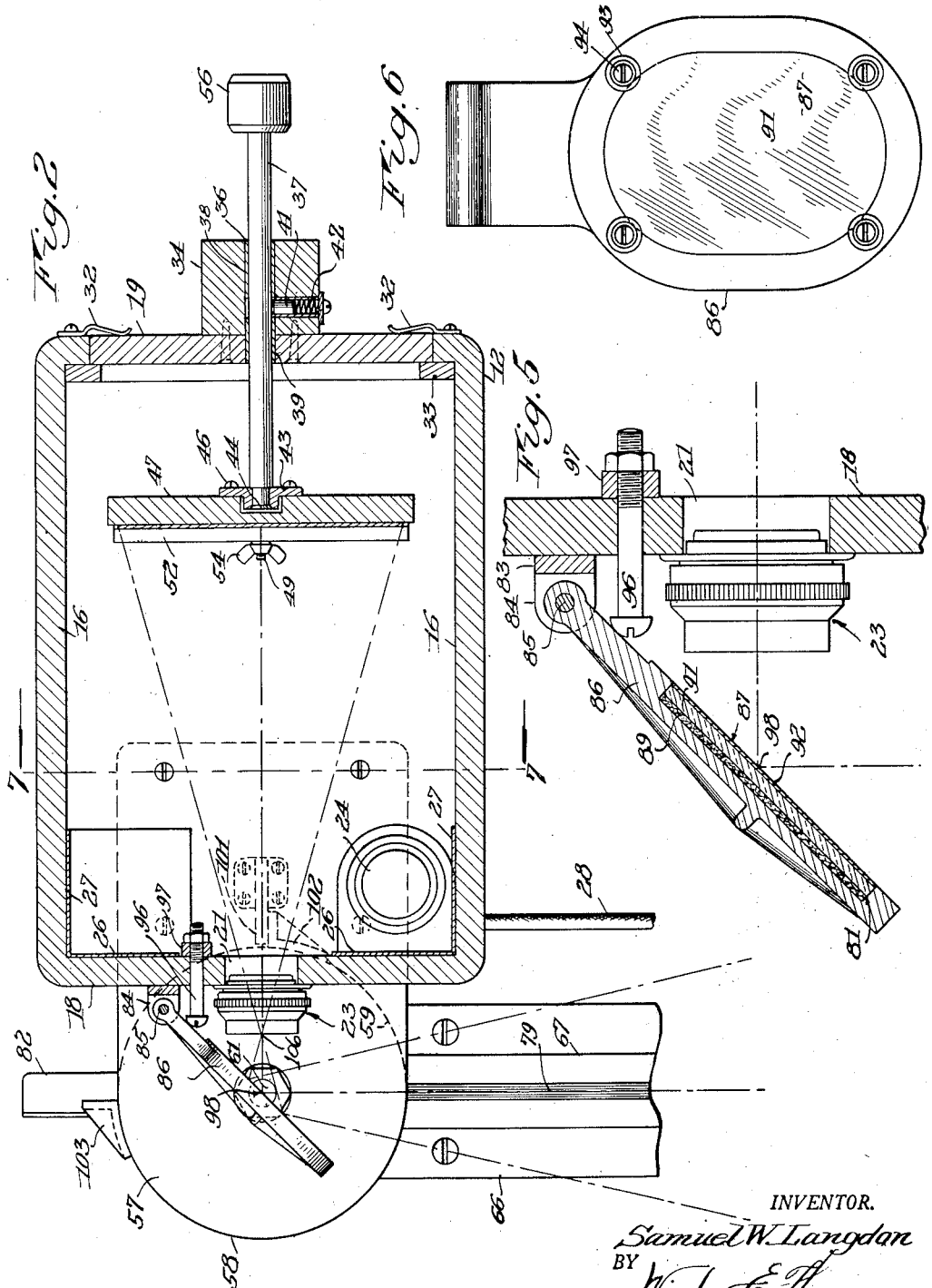

May 3, 1949.　　　　S. W. LANGDON　　　　2,468,935
PHOTOGRAPHIC APPARATUS FOR REPRODUCTION
BY DIRECT OR REFLECTED LIGHT BEAMS
Filed Jan. 25, 1945　　　　　　　　　　　　4 Sheets-Sheet 3
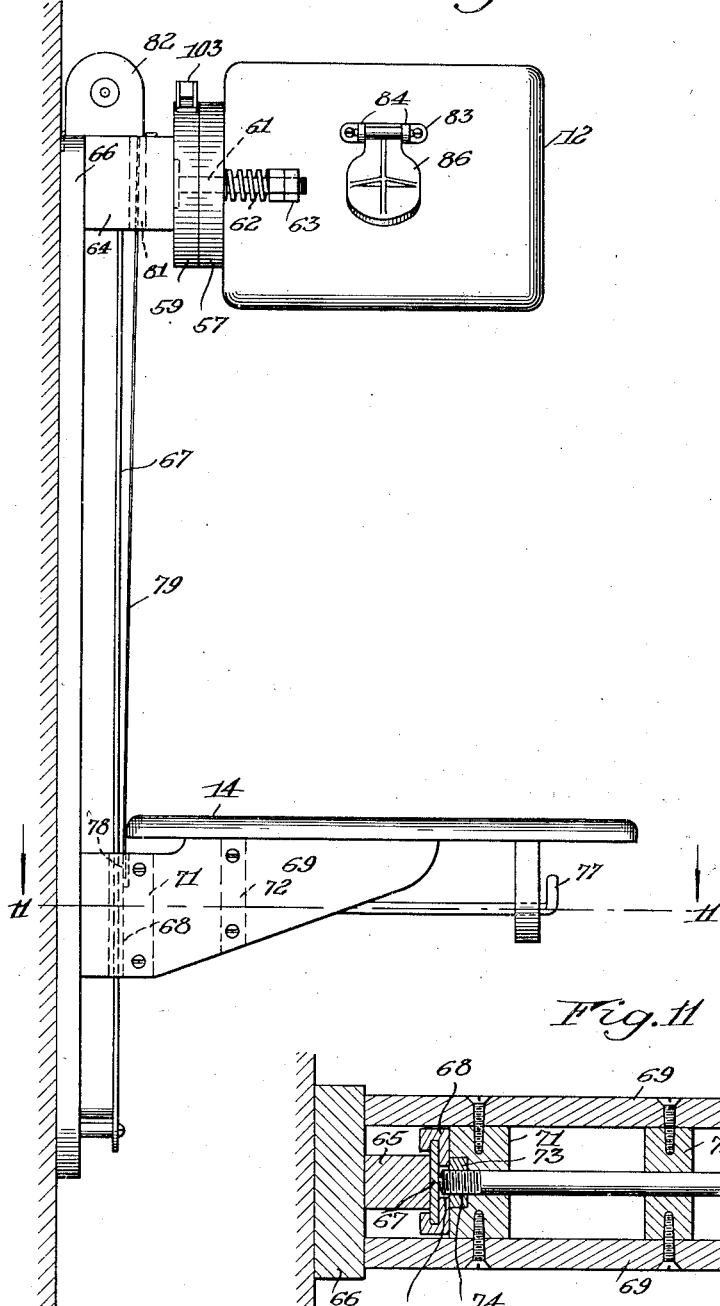
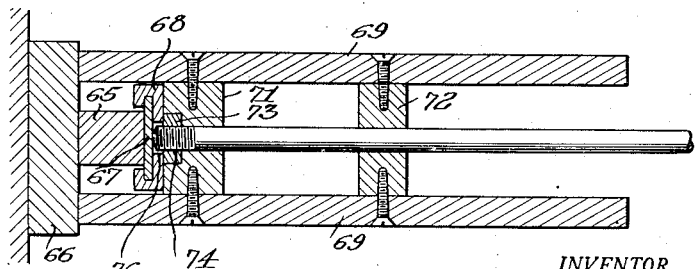
INVENTOR.
Samuel W. Langdon
BY
his Attorney

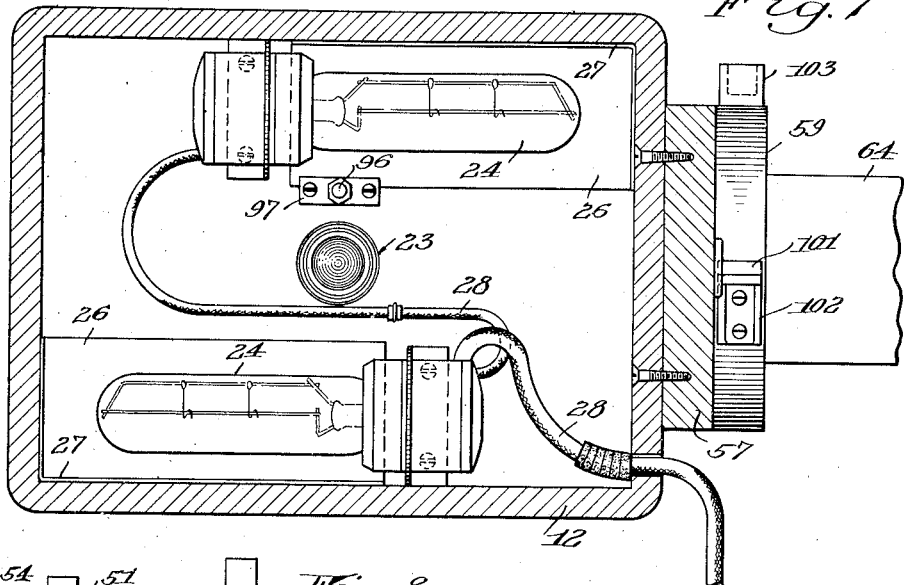
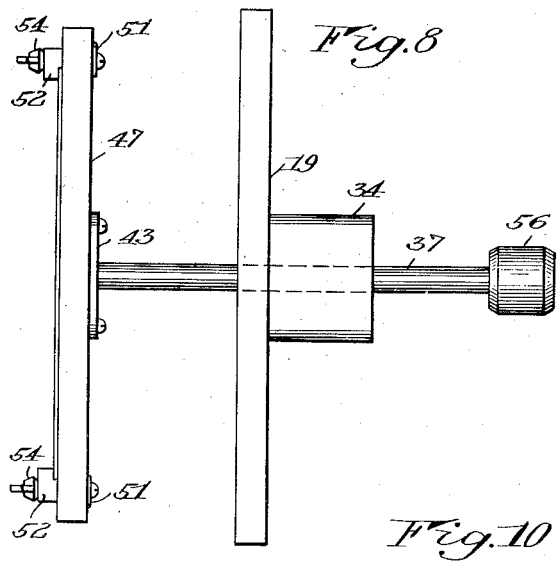
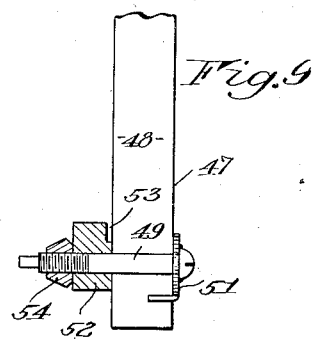
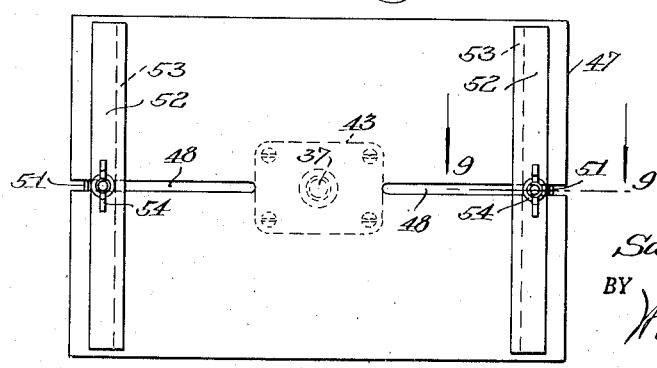
INVENTOR.
Samuel W. Langdon
BY
Winslow E. Thurne
his Attorney Patented May 3, 1949

2,468,935

UNITED STATES PATENT OFFICE 2,468,935

PHOTOGRAPHIC APPARATUS FOR REPRODUCTION BY DIRECT OR REFLECTED LIGHT BEAMS

Samuel W. Langdon, Rochester, N. Y., assignor to Marful Specialties, Incorporated, Rochester, N. Y., a corporation of New York Application January 25, 1945, Serial No. 574,481

2 Claims. (Cl. 88—24)

My invention relates to photographic apparatus and more particularly to photographic copying apparatus adapted to make enlargements or copies directly from a subject onto sensitized paper.

An object of my invention is to provide photographic variable focus apparatus adapted to make enlargements or copies of photographs or other subjects directly on sensitized paper without reversal of the image.

Another object of my invention is to provide photographic apparatus capable of making enlargements or copies directly on sensitized paper without image reversal or capable selectively of reversing the image if reversal is desired.

A further object of my invention is to provide photographic variable focus apparatus adapted primarily for use in a dark room in which a reflecting surface is interposed between the lens system and the easel so as to produce enlargements or copies of the original photograph or subject without reversal of the original, the apparatus being arranged so that it may be shifted to simultaneously and automatically remove the reflecting surface from the path of light rays and arrange the elements of the apparatus so that enlargement or copies with reversal may be made.

My invention further contemplates the provision of photographic variable focus apparatus in which a light tight box, carrying a lens system, is pivotally supported so that a photograph or subject mounted in the light tight box may be enlarged or copied either with or without reversal of the image so as to produce enlargements or copies which are either reversals of the original photograph or subject or which are direct reproductions of the original.

Other objects and advantages of my invention will be set forth in the claims and will be apparent from the following description, when taken in connection with the drawings, in which:

Fig. 1 is a vertical view of the photographic apparatus of my invention showing the light tight box in a horizontal position and the mirror in position so as to make enlargements or copies on sensitized paper without reversal of the image;

Fig. 2 is an enlarged view of a portion of Fig. 1 with the light tight box in section so as to show the position of the lighting elements and the adjustable or variable focus position of the photograph or subject to be enlarged;

Fig. 3 is a view of the apparatus of my invention with the light tight box swung to a vertical position so as to produce reversed enlargements or copies of the original photograph or subject;

Fig. 4 is a side elevation of Fig. 1;

Fig. 5 is an enlarged sectional view of the mirror together with the means for adjustment thereof;

Fig. 6 is a face view of the mirror;

Fig. 7 is a sectional view taken substantially on the line 7—7 of Fig. 2;

Fig. 8 is a view showing the rear door or panel of the light tight box together with the adjustable subject holder or mounting plate carried thereby;

Fig. 9 is an enlarged sectional view of a portion of the mounting plate for the photograph to be enlarged or copied taken substantially on the line 9—9 of Fig. 10;

Fig. 10 is a front view of the mounting plate for the photograph to be enlarged, and Fig. 11 is a sectional view taken substantially on the line 11—11 of Fig. 4.

The apparatus of my invention will be described as an enlarger for photographs and adapted for use primarily in a dark room. However, it will be appreciated that the apparatus may be used for subjects other than photographs and may be used for making copies as distinguished from enlargements. Moreover, by changing the lens system, as is well known in the art, the apparatus may be used as a reducer.

As shown in Fig. 1 the photographic enlarger or copying apparatus of my invention comprises a light tight box or housing, generally indicated by the numeral 12, which is pivotally supported, as generally indicated at 13, and an adjustable table or easel 14 for receiving the direct positive sensitized paper upon which the subject is to be reproduced to the desired enlarged size.

The light tight box, as shown most clearly in Fig. 2, is a complete enclosure having top and bottom walls 16, side walls 17, a front wall 18 and a removable rear wall or panel 19. The front wall has an opening 21 through which the light rays reflected from the subject are projected. Supported in the opening 21 by means of a mounting plate 22, is a photographic lens system and diaphragm, generally indicated by the numeral 23. Since the lens system and diaphragm employed constitute no part of my present invention and since photographic elements of a type suitable for use are well known in the photographic art it is unnecessary to describe the lens system and diaphragm in particular.

Mounted on the inner side of the front wall (Figs. 2 and 7) of the light tight box are a pair of lighting elements 24. These light sources may be of any suitable type adapted to produce brilliant illumination within the box. Between the walls and the light sources, as indicated at 27, are sheets of asbestos 28 for preventing the heat generated by the light sources from scorching or igniting the box. The light sources are connected by means of current carrying cords 23 to a source of current or wall plug (Fig. 1) 29. A switch 31 is provided for controlling the flow of current to the light sources.

The rear wall or panel 19 of the light tight box (Fig. 2) is normally supported in position by means of spring clips 32 which press the rear wall 19 against a rectangular framing 33 carried on the inside of the box. A support or bearing block 34 extends rearwardly of the rear wall and has a bore 36 extending therethrough connecting with a bore formed in the rear wall. A focusing rod 37 extends through the connected openings and is shiftable longitudinally of the box. A pair of bushings 38, 39 are interposed between the focusing rod and the margins of the bores, the inner ends of the bushings being separated sufficiently to receive between them the end of a plunger 41 which is spring pressed into position against the rod, as indicated at 42. With this arrangement the focusing rod will be held frictionally in any desired adjusted position.

The forward or inner end of the focusing rod 37 is adapted to receive a plate 43 which is held in position by a screw 44 extending into the end of the focusing rod. The plate 43 supports by means of screws 46 a photograph or subject mounting plate 47. The mounting plate is shown most clearly in Figs. 8, 9, and 10 and is provided with laterally extending slots 48. A bolt 49 extends through the slot and is provided with suitable means, as indicated at 51, for preventing rotation of the bolt.

Two bolts 49 are provided (Fig. 9), the bolts carrying guide bars or subject holders 52 which are slotted or recessed longitudinally thereof, as indicated at 53, for the reception of the photograph or subject to be enlarged. The outer ends of the bolts are provided with wing nuts 54 for tightening the guide bars in a desired adjusted position. With this arrangement and with the rear panel of the box removed, as indicated in Fig. 8, the photograph or subject is centered on the mounting plate and the guide bars shifted laterally in the slots 48 so that the edges of the photograph are confined in the recesses 53. The wing nuts are then tightened so that the guide bars retain the photograph in the desired centered position. The rear panel assembly is then replaced in the light tight box.

It will now be appreciated that after the photograph or subject has been properly mounted and centered on the mounting plate that, by means of a hand piece 56 on the outer end of the focusing rod, the subject may be moved forwardly or rearwardly with respect to the lens system for the purpose of bringing the subject into sharp focus as will presently appear.

Rigid with the rearward side wall of the light tight box is a supporting plate 57 which extends forwardly of the front wall and has its projecting end, as shown at 58, formed on the arc of a circle. A circular fixed mounting plate 59 extends in facing relation with the supporting plate 57 and the two plates are pivoted with respect to each other by means of a pivot rod 61. The pivot rod is fixed with respect to the mounting plate 59 (Fig. 4) and the supporting plate 57 is rotatable on the mounting plate. A spring 62, confined and tensioned by a pair of nuts 63, places sufficient friction on the facing surfaces of the supporting and mounting plates so that the parts will be held in a desired adjusted position. The supporting plate 59 is secured to and rigid with a block 64 which extends rearwardly therefrom and is carried by a mounting board 66. The mounting board 66 may be attached to a wall or other rigid support.

The mounting board supports a post 65 which rigidly carries a guide rail 67 (Figs. 4 and 11) upon which is freely slidable a guide 68. A pair of brackets 69 are held in spaced relation rigidly by a pair of blocks 71 and 72 which extend between the brackets. The brackets support the table or easel 14. The block 71, as shown in Fig. 11, has a recess for the reception of a metal plate 73 to which the guide 68 is secured. The blocks 71 and 72 are bored for the reception of a locking rod. The end of the rod is threaded for reception in threaded bores 74 and 76 provided respectively in the plate 73 and the guide 68. The projecting end of the rod is provided with a hand piece 77 by which the rod may be rotated.

When it is desired to adjust the position of the easel, the rod is rotated so as to disengage the end of the rod from its normal position of bearing against the guide rail 67. The easel may then be adjusted upward or downward to the desired position. The rod may then be rotated to its normal position with its end bearing against the guide rail 67 in which position the easel is locked in its adjusted position.

Secured to a movable portion of the easel, as shown at 78, is a metal tape 79 which extends upward through a slot 81 formed in the block 64. The end of the tape extends into a housing 82 wherein a spring is mounted for tensioning and retracting the tape. By this means the entire easel assembly is counter balanced so that it may be easily shifted from one position to another.

Mounted on the front wall of the light tight box (Fig. 5) is a bracket 83 which has spaced ears 84 between which a pivot pin 85 is carried. The pivot pin rotatably supports a frame 86 which carries a mirror assembly 87. The frame 86 has a recess 88 the bottom of which is covered with velvet or felt 89. A sheet of glass 91 is supported on the velvet cushion and serves as a carrier for the reflecting surface 92. The glass is selected for the planary character of its surface and the reflecting material, preferably chromium, is deposited evenly on the first surface thereof so that as nearly as possible, considered with respect to such plane, the angle of reflection is equal to the angle of incidence. The character of the glass desired and the optical characteristics of the reflecting surface are well known in the photographic art.

The mirror is held in position in the recess (Fig. 6) by means of relatively soft washers 93 and screws 94 threaded into the frame. The planary surface of the mirror is normal to the lens axis of the plane if the mirror were swung into parallelism with the lens. More clearly stated, when the frame is held at a 45° angle to the lens axis by means presently described, the reflecting surface lies accurately in a plane at a 45° angle to the lens axis. Moreover, it will be observed, in the preferred form of the invention, that a line extending through the axis of the lens to the center of the subject mounting plate is parallel to the plane of the easel and that the plane of the reflecting surface is at a 45° angle both to said line and the plane of the easel.

The mirror is further provided with an adjustment comprising a bolt 96 which projects through the front wall of the camera and the slotted end of which engages the mirror frame (Fig. 5). The inner end of the bolt is provided with a pair of nuts 97 by which the bolt may be locked in an adjusted position. The purpose of this adjustment is to position the mirror so that the plane of its surface 92 passes through the axis 98 (Fig. 2) of the pivot rod 61, or at an angle of 45° to the lens axis. Thus when the light tight box is swung from the position shown in Fig. 3 to that shown in Fig. 1, the mirror swings freely into engagement with the end of the bolt 96 and the mirror surface is accurately positioned with its plane in coincidence with the axis of rotation of the light tight box.

A stop 101 (Fig. 7) on the supporting plate 57 is engageable with stops 102 and 103 spaced 90° apart and provided on the mounting plate 59 to accurately position the light tight box in its horizontal position (Fig. 1) or its vertical position (Fig. 2). The friction between the supporting plate 57 and the mounting plate 59 caused by the spring 62 is sufficient to hold the parts in their adjusted position.

When an enlargement or copy is to be made the easel may be adjusted to approximately the position required to make the desired size of enlargement. The particular enlarger shown is capable of making copies or any enlargement up to a 4 to 1 ratio although it will be understood the limits specified may be varied upward and downward if a proper lens system is used as is well known in the art. If desired, to aid the operator in positioning the easel a scale may be provided along the easel mounting to indicate the approximate position of the easel required for a particular size of enlargement. The photograph to be enlarged is placed in the guide bars of the mounting plate, in the manner previously described, and the focusing rod is adjusted to bring the subject into sharp focus. If no scale were provided, several adjustments of the lens to sensitixed paper distance and lens to subject distance might be required before the elements were in their proper desired relationship.

It will be noted, by tracing the lines indicating the projection of the light rays in Fig. 2 as they pass through nodel point 106 of the lens to the mirrored surface and then are reflected to the easel, that the copy or enlarged reproduction is an exact reproduction of the original without reversal. Thus the image produced on the sensitized paper is an exact copy or enlarged duplicate of the original. When the light tight box is shifted to its vertical position (Fig. 3) a reversal of the original is produced on the sensitized paper. This is often desired when the photograph to be enlarged is a reversal of the original subject. Thus a reversed subject may be enlarged to reproduce on the sensitized paper an enlargement of the original subject with the elements thereof in their original relationship.

Of particular importance is the fact that the reflecting surface automatically swings by gravity accurately into position when reproductions without reversal are to be made and automatically swings out of position when reproductions with reversal are to be made. Moreover, it will be noted (Fig. 3) that the reflecting surface and its frame are swung to such position that with the photograph or subject shifted to its maximum forward position in the light tight box, reflected rays from the subject and passing through the lens, clear the frame.

While I have shown the light tight box as being movable through 90° to change from enlargements or copies which are reversals of the subject to those which are not reversals, it will be understood that this angle may be varied in which case the angle of the reflecting surface to the lens axis should also be changed. However, the arrangement shown is more convenient. Moreover, it would be possible to shift the easel through an angle of preferably 90° instead of the light tight box. This arrangement also would be less convenient as it is desirable that the easel be at all times in a horizontal position.

Attention is directed to the fact that while I have shown the apparatus arranged for making enlargements of photographs by light reflected from the original photograph, it would be possible to adapt the invention to a projection type of apparatus in which case the light would be projected through, for example, a transparent negative. Moreover, I have stressed the fact that the machine is capable of producing enlargements or copies of photographs on direct positive sensitized paper. However, my invention is adapted for use with any type of sensitized paper and may be employed, for example, for making duplicate copies of drawings and for other purposes obvious to those skilled in the art.

It will be appreciated that the drawings are merely illustrative; that the parts have not necessarily been shown in focus; and that various changes and modifications may be made, particularly in the form and relationship of parts, without departing from the spirit of my invention as set forth in the appended claims.

I claim:

1. Photographic apparatus comprising, in combination, a light tight enclosure in which the subject is mounted, a light source in said enclosure, said enclosure having an opening, a lens system mounted adjacent said opening through which the image is projected, an easel upon which the sensitized paper is placed, a plane reflecting device having a pivot on the enclosure, pivot means for enabling the enclosure to be shifted from a position such that the lens axis is substantially parallel to the easel to a position such that the lens axis is substantially normal to the easel, said reflecting device being located so that the pivot means lies substantially in the plane of the reflecting device when the lens axis is parallel to the easel whereby when the enclosure is shifted to a position such that the lens axis is normal to the plane of the easel the length of the optical path remains substantially the same as when the image is reflected through the reflecting device, said reflecting device swinging out of the optical path when the enclosure is shifted to the position in which the lens axis is normal to the easel.

2. Photographic apparatus comprising, in combination, a light tight enclosure in which the subject is mounted, a light source in said enclosure, said enclosure having an opening, a lens system mounted adjacent said opening, an easel, a plane reflecting device, pivot means for enabling the enclosure to be shifted from a position such that the lens axis is substantially parallel to the easel to a position such that the lens axis is substantially normal to the easel, said reflecting device being pivoted on the enclosure above the lens axis and having a stop arranged in a position such that the reflecting device and the pivot means lie in substantially the same plane when the lens axis is parallel to the easel, whereby when the enclosure is shifted about said pivot means to a position such that the lens axis is normal to the plane of the easel the length of the optical path remains substantially the same as when the image is reflected through the reflecting device, said shifting of the enclosure enabling the reflecting device to swing on its pivot and fall by gravity out of the optical path of the lens system.

SAMUEL W. LANGDON.

REFERENCES CITED

The following references are of record in the file of this patent:

UNITED STATES PATENTS

| Number | Name | Date |
| --- | --- | --- |
| 1,268,609 | Powell | June 4, 1918 |
| 1,273,183 | Ramsay | July 23, 1918 |
| 1,479,211 | Ames, Jr. et al. | Jan. 1, 1924 |
| 1,633,228 | Rogers | June 21, 1927 |
| 1,644,781 | Holman et al. | Oct. 11, 1927 |
| 1,647,814 | Reyes | Nov. 1, 1927 |
| 2,211,218 | Serrurier | Aug. 13, 1940 |
| 2,303,920 | Drucker | Dec. 1, 1942 |
| 2,324,842 | Huebner | July 20, 1943 |

FOREIGN PATENTS

| Number | Country | Date |
| --- | --- | --- |
| 731,359 | France | Sept. 2, 1932 |